US 8,028,104 B2

(12) United States Patent
Meyer et al.

(10) Patent No.: US 8,028,104 B2
(45) Date of Patent: Sep. 27, 2011

(54) METHOD AND SYSTEM FOR POLLING MULTIFUNCTION DEVICES BASED ON PERFORMANCE CRITERIA

(75) Inventors: Lawrence W. Meyer, Fairport, NY (US); Matthew Scrafford, Fairport, NY (US); Daniel Stark, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 245 days.

(21) Appl. No.: 12/362,206

(22) Filed: Jan. 29, 2009

(65) Prior Publication Data

US 2010/0191877 A1    Jul. 29, 2010

(51) Int. Cl.
G06F 3/00 (2006.01)
G06F 5/00 (2006.01)
(52) U.S. Cl. .............. 710/46; 710/38; 710/44; 710/47
(58) Field of Classification Search .................. None
See application file for complete search history.

(56) References Cited

U.S. PATENT DOCUMENTS

| 7,093,141 | B2 | 8/2006 | Elnozahy et al. | |
| 7,567,946 | B2* | 7/2009 | Andreoli et al. | 706/46 |
| 2002/0196463 | A1* | 12/2002 | Schlonski et al. | 358/1.15 |
| 2007/0177196 | A1* | 8/2007 | Maeda | 358/1.15 |
| 2008/0077700 | A1* | 3/2008 | Hibino | 709/230 |
| 2008/0114860 | A1* | 5/2008 | Keys et al. | 709/219 |
| 2008/0228956 | A1* | 9/2008 | Lorenzo et al. | 710/18 |
| 2008/0239367 | A1* | 10/2008 | Podl | 358/1.15 |
| 2008/0244107 | A1* | 10/2008 | Uno | 710/15 |
| 2009/0150878 | A1* | 6/2009 | Pathak et al. | 717/172 |

* cited by examiner

*Primary Examiner* — Henry Tsai
*Assistant Examiner* — Kris Rhu
(74) *Attorney, Agent, or Firm* — Kermit D. Lopez; Luis M. Ortiz; Ortiz & Lopez, PLLC (57) ABSTRACT

A method and system suitable for grouping a plurality of multifunction devices (MFDs), the system including a storage station for storing information gathered from the plurality of MFDs by selectively polling the plurality of MFDs; wherein the information is selectively processed based on static performance data and dynamic performance data relating to the plurality of MFDs.

24 Claims, 4 Drawing Sheets

METHOD AND SYSTEM FOR POLLING MULTIFUNCTION DEVICES BASED ON PERFORMANCE CRITERIA

BACKGROUND

1. Field of the Related Art

The present disclosure relates to printing systems, and more particularly, to a method and system for grouping a plurality of MFDs based on performance criteria.

2. Background of the Related Art

In general, a multifunction device (MFD) operates as a plurality of different imaging devices, including, but not limited to, a printer, copier, fax machine, and/or scanner. In recent years the basic office copier has evolved into what can be referred to as a MFD. With digital technology, a machine with the basic outward appearance of a traditional copier can perform at least the additional functions of printing documents submitted in digital form over a network, sending and receiving messages via facsimile, recording hard-copy original images in digital form and sending the resulting data over a network, such as in electronic mail and/or recording hard-copy original images in digital form on a compact disc or equivalent medium.

In the area of digital printing and copying, there has been a growth in demand for MFDs. Such MFD devices may assume the form of an arrangement in which a single print engine (e.g., xerographic or thermal ink jet print engine) is coupled with a plurality of different image input devices (or "services"), with such devices being adapted to produce image related information for use by the printer or transmitted over a network. The image related information, in one example, could have its origin in video facsimile signals, microfilm, data processing information, light scanning platens for full size documents, aperture cards, and microfiche. MFDs provide a broader range of functionality than traditional single-function devices, such as dedicated printers, copiers, and scanners. As a result, because of their network transmission capabilities combined with their functionality, it would be useful to poll MFDs into one or more groups based on performance criteria.

Polling is an alternative method to interrupts by which the processor (CPU) may process device requests. A CPU may, for example, poll a network device to determine if there are any packets to be processed. Network appliances, including software-based switches, firewalls, proxy servers, and even first-tier web servers are increasingly making use of polled input/output (I/O) to actively coalesce interrupts, and increase overall system performance by reducing the latencies involved with context switching during interrupt handling.

However, polling can be an inefficient mechanism due to the unnecessary and continuous checking of device status when the rate of device activities such as network traffic is not relatively high. Additionally, polling can be detrimental to power consumption since it occurs constantly, whether there is work to do or not, thus preventing the system from ever entering a "sleep" state where appropriate instructions can be issued to conserve power spent by the CPU. Thus, polling can adversely affect power conservation and the average time to gather information from a plurality of MFDs.

Currently network management tools poll MFDs to get current status information. It is desirable to have the most current status information. However, this comes at an expense of a high amount of network traffic being generated. It is also desirable to obtain a current status on a large number of network devices. However, communication with some devices takes a larger amount of time and some devices fail to communicate at all. Proposed alternatives, such as registering for events on devices (e.g., SNMP traps), is not standardized, and generates excessive traffic on unwanted events.

Thus, in conventional systems, there is no method for grouping devices based on performance criteria. Instead, conventional polling systems have focused on polling network devices for status information in large groups by using a single maximum Timeout (TO) and Retry (RT) value for network communication. The request for status information typically requires many Object Identifier (OID) objects, which often results in multiple Communication Requests (CR) with the Network Device (ND). With a sufficiently large number of network devices, and with different types of devices, and different states (able to communicate or not) and varying network environments, the resulting communication varies enough so that the maximum timeout and retry values will always be exceeded for each communication request to all devices. As a result, this is an inefficient and time-consuming process.

Consequently, current systems lack the capability to effectively group devices based on performance criteria. The present disclosure is intended to overcome the drawbacks of other methods by providing for grouping a plurality of MFDs based on one or more specific performance criteria.

SUMMARY

The present disclosure provides a system suitable for grouping a plurality of multifunction devices (MFDs), the system including a storage station for storing information gathered from the plurality of MFDs by selectively polling the plurality of MFDs; wherein the information is selectively processed into one or more groups based on static performance data and dynamic performance data relating to the plurality of MFDs.

The present disclosure also provides a method suitable for grouping a plurality of multifunction devices (MFDs), the method including selectively polling the plurality of MFDs; receiving information from the plurality of MFDs selectively polled; storing the information gathered from the plurality of MFDs selectively polled; and selectively processing the information into one or more groups based on static performance data and dynamic performance data relating to the plurality of MFDs.

The present disclosure also provides a computer-readable medium which stores programmable instructions configured for being executed by at least one processor for performing the methods described herein according to the present disclosure. The computer-readable medium can include flash memory, CD-ROM, a hard drive, etc.

BRIEF DESCRIPTION OF THE DRAWINGS

Various embodiments of the present disclosure will be described herein below with reference to the figures wherein.

DETAILED DESCRIPTION

The present disclosure proposes a method of grouping multifunction devices (MFDs) for communication based on performance criteria that improves overall efficiency while still providing the desired status data on a large number of networked devices. The criteria involve using static performance data relating to the MFDs and previously gathered dynamic performance data. The static grouping criteria are based on a MFDs capability, such as the capability to communicate over a higher performance protocol. The dynamic performance grouping criteria are based on previous communication statistics, such as the average response time and average retries needed to communicate with the device. Running several processes in parallel with each process configured to match the groups communication requirements results in a faster and more efficient means of gathering data for a large number of MFDs.

The term "print" is overloaded to mean sending the document to the printer through any one of a multitude of ways. Moreover, the term "printer" can refer to any device that accepts text and graphic output from any type of computing device and transfers the information to any printable medium. A "printer" can refer to any type of xerographic, solid ink, liquid ink, cut sheet or web-based device used to print onto a wide array of printable media. The term "printer" as used herein encompasses any apparatus, such as a digital copier, bookmaking machine, facsimile machine, multi-function machine, etc. which performs a print outputting function for any purpose.

MFDs disclosed herein include both those that are "connected" and those that are "unconnected." An "unconnected" MFD does not have access to a network (e.g., the Internet). A "connected" MFD is normally connected via an Ethernet card or the like to a network. In the present embodiments, the MFD may be an unconnected MFD that is in operative communication with a wireless device, the wireless device being able to access a network. A connection between the multifunctional device and the wireless device is made through a two-way communication channel located on the multifunctional device.

The term "MFD" can refer to any machine that connects to either a computing device and/or network and performs one or more of the following functions: print, scan, copy, and/or fax. Digital copiers, fax machines, printers, and scanner combinations are all examples of MFDs. The term "MFD" can further refer to any hardware that combines several functions in one unit. For instance, an MFD can be a standalone printer or any type of standalone machine/device/apparatus/component. For example, an MFD can be one or more personal computers (PCs), a standalone printer, a standalone scanner, a mobile phone, an MP3 player, audio electronics, video electronics, GPS systems, televisions, recording and/or reproducing media (such as CDs, DVDs, camcorders, cameras, etc.) or any other type of consumer or non-consumer analog and/or digital electronics. Such consumer and/or non-consumer electronics can apply in any type of entertainment, communications, home, and/or office capacity. Thus, the term "MFDs" can refer to any type of electronics suitable for use with a circuit board and intended to be used by a plurality of individuals for a variety of purposes.

The term "storage" can refer to data storage. "Data storage" can refer to any article or material (e.g., a hard disk) from which information is capable of being reproduced, with or without the aid of any other article or device. "Data storage" can refer to the holding of data in an electromagnetic form for access by a computer processor. Primary storage is data in random access memory (RAM) and other "built-in" devices. Secondary storage is data on hard disk, tapes, and other external devices. "Data storage" can also refer to the permanent holding place for digital data, until purposely erased. "Storage" implies a repository that retains its content without power. "Storage" mostly means magnetic disks, magnetic tapes and optical discs (CD, DVD, etc.). "Storage" may also refer to non-volatile memory chips such as flash, Read-Only memory (ROM) and/or Electrically Erasable Programmable Read-Only Memory (EEPROM).

The term "polling" may refer to any method by which a processor/computing device/electronic means may process device (e.g., MFD) requests. The term "polling" may also refer to a communications technique that determines when a terminal is ready to send data and/or making continuous requests for data from another device. The computer may continually interrogate its connected terminals in a, for example, round robin sequence. If a terminal has data to send, it sends back an acknowledgment and the transmission begins. The term "polling" may also refer to a technique that continually interrogates a peripheral device to see if it has data to transfer. The term "polling" may also refer to the continuous checking of other programs or devices by one program or device to see what state they are in, usually to see whether they are still connected or want to communicate. Specifically, in multipoint or multi-drop communication (a controlling device with multiple devices attached that share the same line), the controlling device sends a message to each device, one at a time, asking each whether it has anything to communicate (in other words, whether it wants to use the line).

The term "static data" may refer to the variables and other data that persist between calls to a particular function or fragment. The term "static data" may also refer to database information that changes little over time (e.g., map files, font files, etc).

The term "dynamic data" may refer to information that is asynchronously changed as further updates to the information become available. The term "dynamic" may refer to an operation that occurs at the time it is needed rather than at a predetermined or fixed time.

Embodiments will be described below while referencing the accompanying figures. The accompanying figures are merely examples and are not intended to limit the scope of the present disclosure.

As described above, the technique of using a single maximum Timeout (TO) and Retry (RT) value for network communications is not desirable because this technique assumes the communication requests have already been optimized by making the requests to all network devices in parallel, meaning one process or thread sends the request to all devices while another process or thread waits for the replies. However, this also means that response time for the slowest device affects all MFDs. Thus, to keep each request independent requires an unacceptable amount of computing resources on the management system that is running the management tool. This can severely slow processing time and network performance.

The present disclosure describes a system and method that continues making requests to large numbers of MFDs in parallel, but by grouping MFDs to provide a more efficient gathering of data. Improving the average time to gather status results in fresher status data for more MFDs. Fresher status data results in faster response times to correct problems regarding the network devices. Faster problem resolution improves the profitability of managing network devices, as described below in reference to the Figures.

Figure 1:
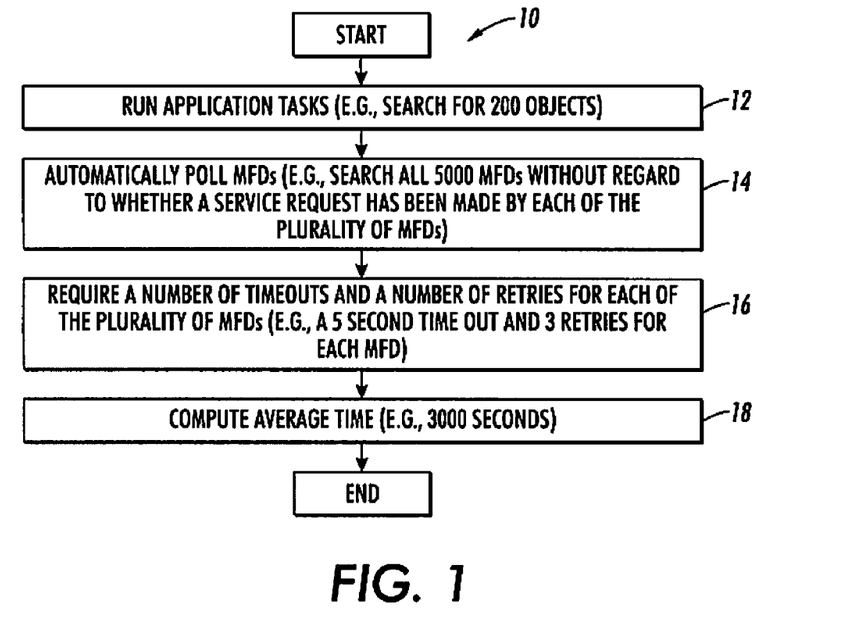
FIG. 1 is a schematic diagram of a flowchart illustrating network performance when no grouping of MFDs takes place, in accordance with the present disclosure.

With reference to FIG. 1, there is presented a schematic diagram of a flowchart illustrating network performance when no grouping of MFDs takes place, in accordance with the present disclosure.

The flowchart 10 includes the following steps. In step 12, application tasks are run by a user. For example, a search is conducted for 200 OID objects. In step 14, the MFDs are automatically polled. For example, all 5000 MFDs on the network are searched without regard as to whether a service request has been made by each of the plurality of MFDs. In step 16, a required number of timeouts and retries are executed for each of the plurality of MFDs. For example, the timeout may set at 5 seconds and the number of retries may be set at three retries per MFD. In step 18, the average time is computed. For example, in this instance, the average time is 3000 seconds under this scenario. The process then ends.

In particular, if no grouping of the MFDs is desired, then the following calculations may be performed:

The worst case scenario is to make a status poll of 200 OID objects on 5000 network MFDs with each object identifier being in a separate communication request, each requiring a 5 second timeout and 3 retries.

200 OIDs*5 second TO*3 RT=3,000 seconds

Average Time to Gather Status=(3,000 seconds*5000/5,000 devices)

Average Time to Gather Status=3,000 seconds

As a result, a significant amount of time (e.g., 3000 seconds in the above example) is necessary to poll all the MFDs on the network when no grouping is performed.

Figure 2:
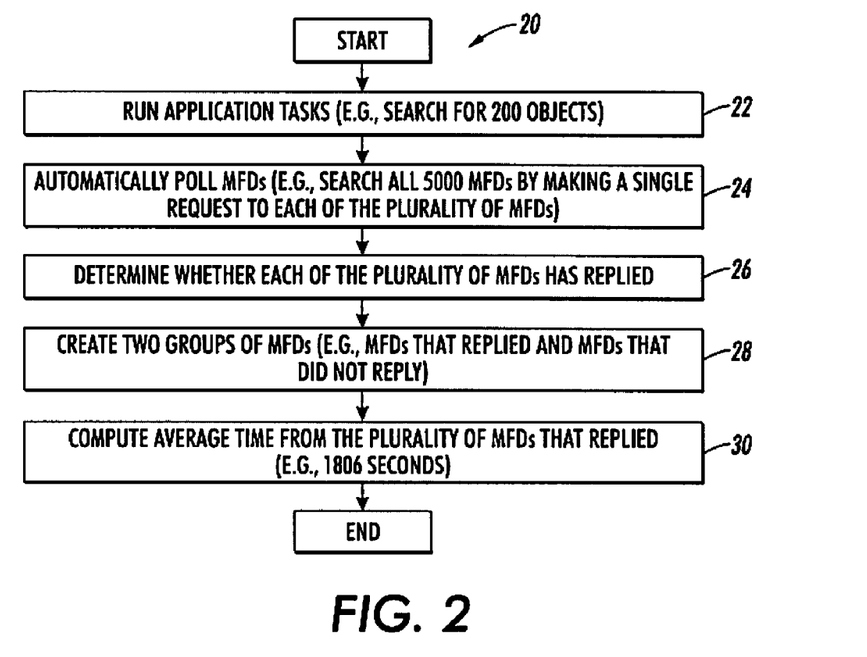
FIG. 2 is a schematic diagram of a flowchart illustrating network performance by dynamically grouping MFDs after making one communication request, in accordance with the present disclosure.

With reference to FIG. 2, there is presented a flowchart illustrating network performance by dynamically grouping MFDs after making one communication request, in accordance with the present disclosure.

The flowchart 20 includes the following steps. In step 22, application tasks are run by a user. For example, a search is conducted for 200 OID objects. In step 24, the MFDs are automatically polled. For example, all 5000 MFDs on the network are searched by performing a service request to each of the plurality of MFDs. In step 26, it is determined whether each of the plurality of MFDs has replied. In step 28, two groups of MFDs are created. For example, one group may pertain to the MFDs that replied and the other group may pertain to the MFDs that did not reply. In step 30, the average time is computed from the plurality of MFDs that replied. For example, in this instance, the average time is 1806 seconds under this scenario. The process then ends.

In particular, if this type of grouping of the MFDs is desired, then the following calculations may be performed:

The technique of FIG. 2 involves dynamically grouping devices after making one communication request. The criteria for grouping are simply whether an MFD replied or not. One group is made up of MFDs that exceeded the maximum timeout and retry and did not reply. The other group is made up of any MFD that did reply to the communication request.

The following example shows a 39.8% improvement on the Average Time to Gather Status over the worst case scenario (described above in FIG. 1) where 500 (10%) of the devices that do not reply to a communication request. The remaining 4,500 network devices responded, but the communication requests are affected by the slowest network device. Therefore the time to wait for all responses is a relatively high 5 seconds over 2 retries. For instance:

Group 1: 5000 Check for No Reply Devices.

1 OID*5 second TO*3 RT=15 seconds

Group 2: 4,500 Devices that Reply

199 OIDs*5 second TO*2 RT=1990 seconds

Average Time to Gather Status=(15 seconds*5000/5,000 devices)+(1990 seconds*4,500/5,000 devices)

Average Time to Gather Status=15+1,791

Average Time to Gather Status=1806 seconds

As a result, a significant amount of time (e.g., 1806 seconds in the above example) is necessary to poll all the MFDs on the network when this type of grouping is performed.

Figure 3:
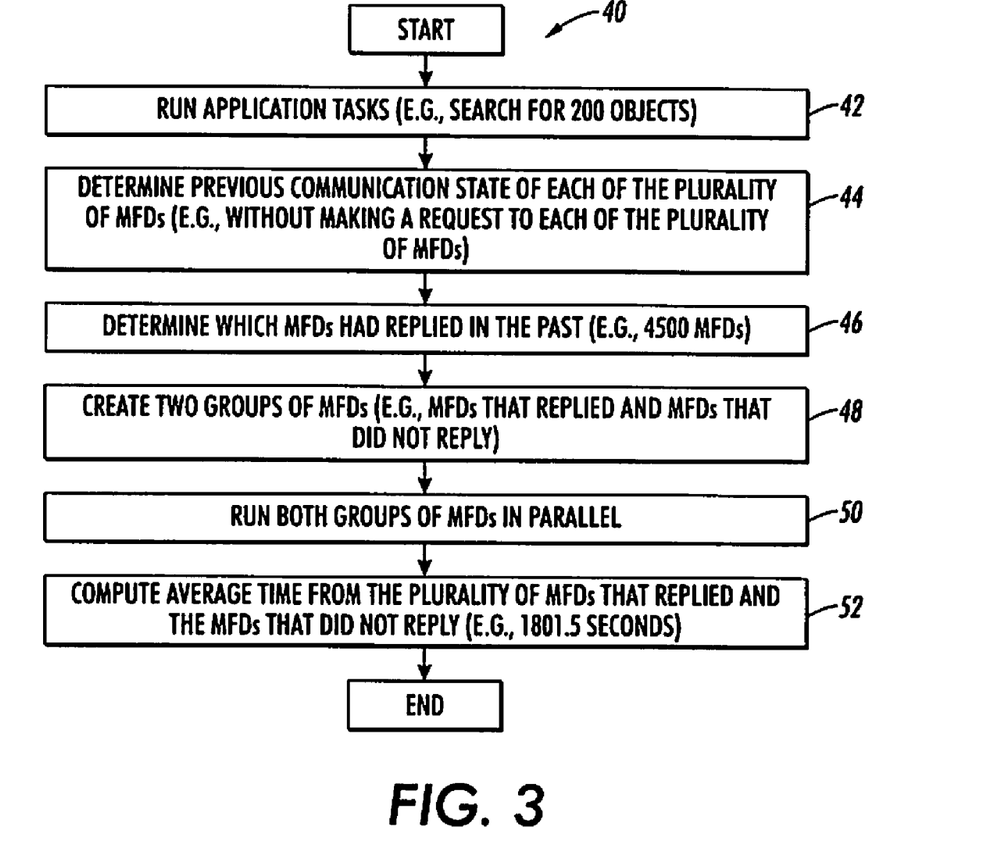
FIG. 3 is a schematic diagram of a flowchart illustrating network performance by grouping MFDs based on a previous communication state, in accordance with the present disclosure.

With reference to FIG. 3, there is presented a flowchart illustrating network performance by grouping MFDs based on a previous communication state, in accordance with the present disclosure.

The flowchart 40 includes the following steps. In step 42, application tasks are run by a user. For example, a search is conducted for 200 OID objects. In step 44, the previous communications state of each of the plurality of MFDs is determined. For example, this is accomplished without making any service requests to any of the plurality of MFDs. In step 46, it is determined which MFDs had replied in the past. For example, 4500 MFDs had replied. In step 48, two groups of MFDs are created. For example, one group may pertain to the MFDs that replied and the other group may pertain to the MFDs that did not reply. In step 50, both groups of MFDs are run in parallel. In step 52, the average time is computed from the plurality of MFDs that replied and the plurality of MFDs that did reply. For example, in this instance, the average time is 1801.5 seconds under this scenario. The process then ends.

In particular, if this type of grouping of the MFDs is desired, then the following calculations may be performed:

The technique described in FIG. 3 involves persisting the communication state of all devices and using that to group devices before making any network communication requests. The criteria allows for both groups to be run in parallel so that each group does not affect the other. The resources required to run a small number of groups in parallel is not excessive.

The following example shows a 39.95% improvement on the Average Time to Gather Status over the worst case scenario (described above in FIG. 1) where 500 (10%) of the devices do not reply to a communication request. The remaining 4,500 network devices respond, but the communication requests are again affected by the slowest network device. Therefore, the time to wait for all responses is a relatively high 5 seconds over 2 retries. For instance:

Group 1: 500 No Reply Devices from persisted data.

1 OID*5 second TO*3 RT=15 seconds

Group 2: 4,500 Replies

200 OIDs*5 second TO*2 RT=2000 seconds

Average Time to Gather Status=(15 seconds*500/5,000 devices)+(2000 seconds*4,500/5,000 devices)

Average Time to Gather Status=1.5+1,800

Average Time to Gather Status=1801.5 seconds

As a result, a significant amount of time (e.g., 1801.5 seconds in the above example) is necessary to poll all the MFDs on the network when this type of grouping is performed.

Figure 4:
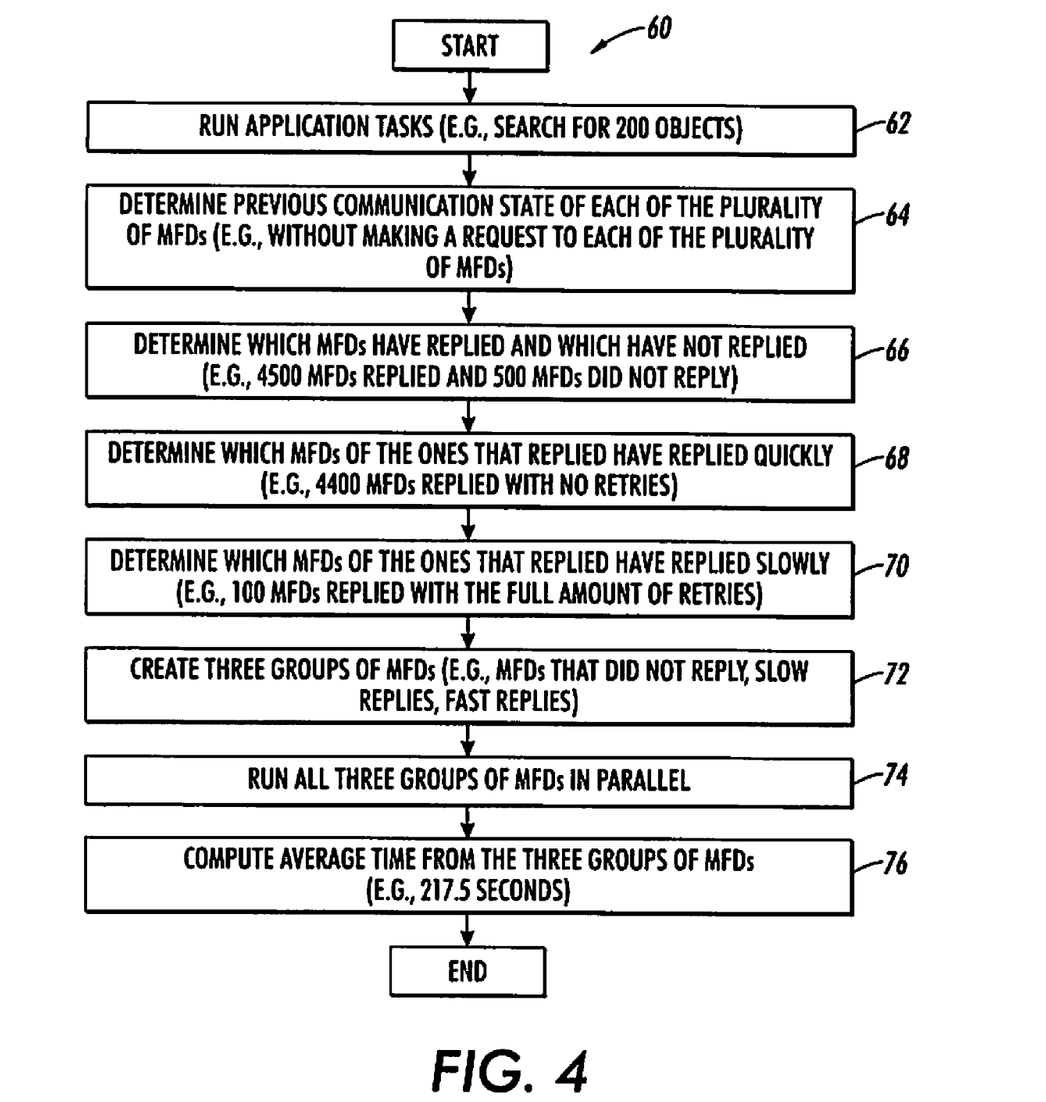
FIG. 4 is a schematic diagram of a flowchart illustrating network performance by grouping MFDs based on an average response time and a number of retries, in accordance with the present disclosure.

With reference to FIG. 4, there is presented a flowchart illustrating network performance by grouping MFDs based on an average response time and a number of retries, in accordance with the present disclosure.

The flowchart 60 includes the following steps. In step 62, application tasks are run by a user. For example, a search is conducted for 200 OID objects. In step 64, the previous communications state of each of the plurality of MFDs is determined. For example, this is accomplished without making any service requests to any of the plurality of MFDs. In step 66, it is determined which MFDs have replied and which have not replied. For example, 4500 MFDs had replied and 500 MFDs have not replied. In step 68, it is determined which MFDs of the ones that replied have replied in a quick manner. For example, 4400 MFDs replied without any retry attempts. In step 70, it is determined which MFDs of the ones that replied have replied in a slow manner. For example, 100 MFDs replied with the maximum number of retry attempts. In step 72, three groups of MFDs are created. For example, one group pertains to the MFDs that did not reply, one group pertains to the MFDs that replied quickly, and another group pertains to the MFDs that replied slowly. In step 74, all three groups of MFDs are run in parallel. In step 76, the average time is computed from the plurality of MFDs that replied (quickly or slowly) and the plurality of MFDs that did not reply. For example, in this instance, the average time is 217.5 seconds under this scenario. The process then ends.

In particular, if this type of grouping of the MFDs is desired, then the following calculations may be performed:

The technique of FIG. 4 involves persisting the response time and retry count for all devices and using that to group devices before making any network communication requests. The criteria allows for three groups to be run in parallel to take advantage of faster responding devices.

The following example shows a 92.75% improvement in total time over the worst case scenario (described above in FIG. 1) where 500 (10%) of the devices do not reply to a communication request. 100 devices require the full 5 second timeout and 2 retries. The remaining 4,400 network devices respond, and with no retries in under a second. For instance:

Group 1: 500 No Reply Devices from persisted data.
1 OID*5 second TO*3 RT=15 seconds
Group 2: 100 Slow Replies
200 OIDs*5 second TO*2 RT=2000 seconds
Group 3: 4,400 Fast Replies SNMPv1
200 OIDs*1 second TO*no RT=200 seconds
Average Time to Gather Status=(15 seconds*500/5,000 devices)+(2000 seconds*100/5,000 devices)+(200 seconds*4,400/5,000 devices)
Average Time to Gather Status=1.5+40+176
Average Time to Gather Status=217.5 seconds As a result, a lesser amount of time (e.g., 217.5 seconds in the above example compared to FIGS. 1-3) is necessary to poll all the MFDs on the network when this type of grouping is performed.

Figure 5:
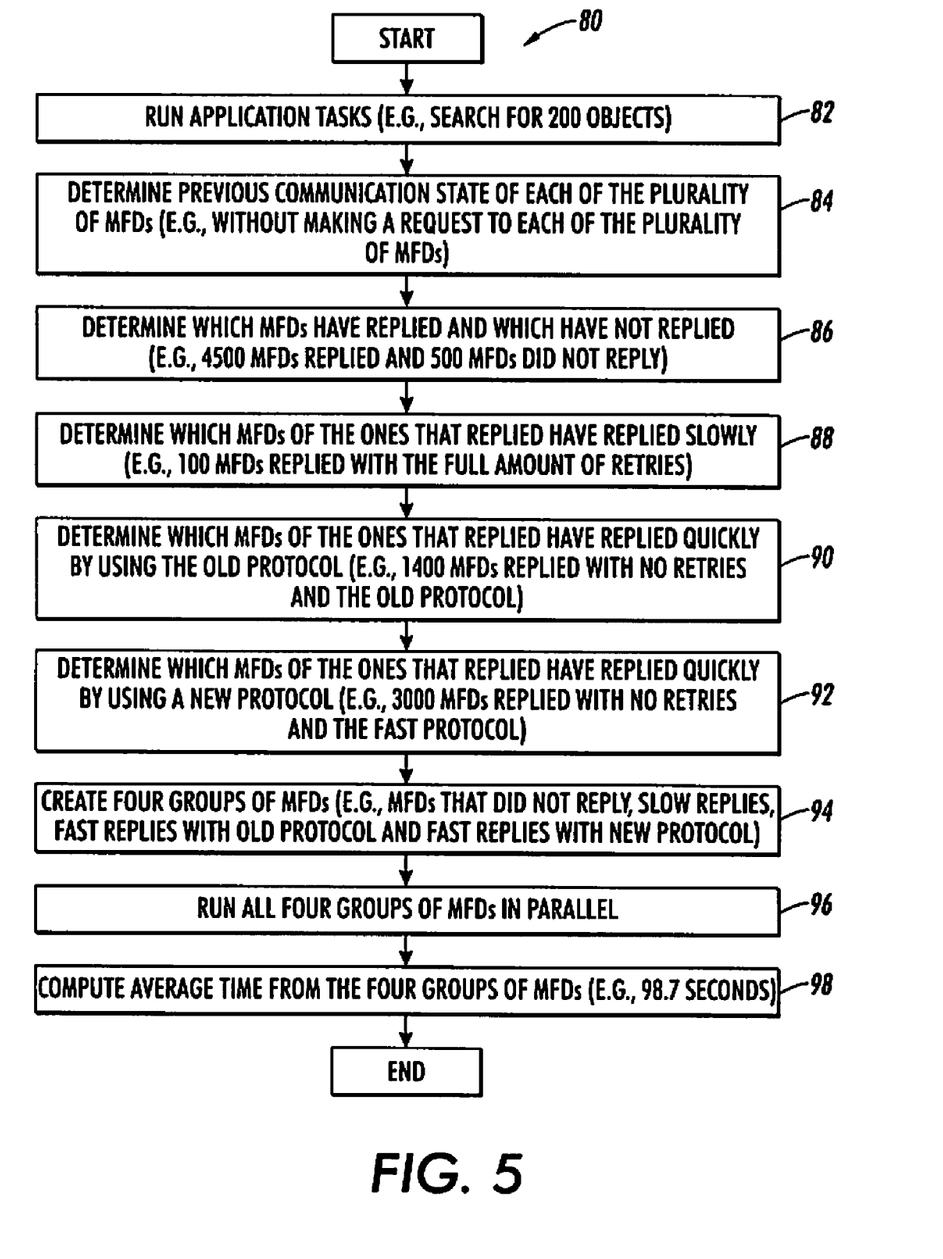
FIG. 5 is a schematic diagram of a flowchart illustrating network performance by grouping MFDs based on one or more protocols, in accordance with the present disclosure.

With reference to FIG. 5, there is presented a flowchart illustrating network performance by grouping MFDs based on one or more protocols, in accordance with the present disclosure.

The flowchart 80 includes the following steps. In step 82, application tasks are run by a user. For example, a search is conducted for 200 OID objects. In step 84, the previous communications state of each of the plurality of MFDs is determined. For example, this is accomplished without making any service requests to any of the plurality of MFDs. In step 86, it is determined which MFDs have replied and which have not replied. For example, 4500 MFDs had replied and 500 MFDs have not replied. In step 88, it is determined which MFDs of the ones that replied have replied in a slow manner. For example, 100 MFDs replied with the maximum number of retry attempts. In step 90, it is determined which MFDs of the ones that replied have replied quickly and by using an old protocol. For example, 1400 MFDs replied with no attempted retries and the old protocol. In step 92, it is determined which MFDs of the ones that replied have replied quickly and by using a new protocol. For example, 3000 MFDs replied with a new protocol. In step 94, four groups of MFDs are created. For example, one group pertains to the MFDs that did not reply, a second group pertains to MFDs with slow replies, a third group pertains to MFDs with fast replies under a slow, old protocol, and a fourth group pertains to MFDs with fast replies under a new, faster protocol. In step 96, all four groups of MFDs are run in parallel. In step 98, the average time is computed from the plurality of MFDs that replied (quickly or slowly) and the plurality of MFDs that did not reply. For example, in this instance, the average time is 98.7 seconds under this scenario. The process then ends.

In particular, if this type of grouping of the MFDs is desired, then the following calculations may be performed:

The technique of FIG. 5 involves persisting the device capabilities and using that to group devices that can respond using a faster protocol before making any network communication requests. The criteria allows for four groups to be run in parallel to take advantage of the faster protocol capable devices.

The following example shows a 96.71% improvement in total time over the worst case scenario (described above in FIG. 1) where 500 (10%) of the devices do not reply to a communication request. 100 devices require the full 5 second timeout and 2 retries. 1,400 network devices respond with the older protocol for example SNMPv1, and with no retries in under a second. The remaining 3000 devices support the faster protocol, for example SNMPv2 which allows get-bulk functionality that can return multiple object identifies in one communication request. For instance:

Group 1: 500 No Reply Devices from persisted data.
1 OID*5 second TO*3 RT=15 seconds
Group 2: 100 Slow Replies
200 OIDs*5 second TO*2 RT=2000 seconds
Group 3: 1,400 Fast Replies SNMPv1
200 OIDs*1 second TO*no RT=200 seconds
Group 4: 3,000 SNMPv2
200 OIDs in 2 requests*1 second TO*no RT=2 seconds
Average Time to Gather Status=(15 seconds*500/5,000 devices)+(2000 seconds*100/5,000 devices)+(200 seconds*1,400/5,000 devices)+(2 seconds*3,000/5,000 devices)
Average Time to Gather Status=1.5+40+56+1.2
Average Time to Gather Status=98.7 seconds As a result, a far lesser amount of time (e.g., 98.7 seconds in the above example compared to FIGS. 1-4) is necessary to poll all the MFDs on the network when this type of grouping is performed.

The present disclosure proposes an alternative method that takes advantage of selectively polling MFDs based on performance criteria. The approaches described above provide any service provider with several grouping approaches for polling a plurality of MFDs. Furthermore, the concept of grouping a plurality of MFDs is a general concept in that it can be used for any type of applications contemplated by one skilled in the art. For example, any service provider could provide/control/own/sell the MFDs. In addition, service providers could use any type of printer and/or MFD and/or electronic device to achieve the desired results of the present disclosure. Also the printing system of the present disclosure makes it easier for information technology (IT) groups and/or service providers to manage the printing environment for their clients.

A service provider can be any entity that develops, offers, controls, manages, owns, alters and/or sells software and/or hardware products. A service provider can be any entity that performs one or more tasks on one or more pre-existing MFDs, which may or may not be controlled or owned by the service provider. For example, the entity can offer a service with an existing software package and/or with any type of existing Internet-based service through the Internet. In other words, a service provider need not own or provide the MFDs. The MFDs may be owned or provided by any third party not related or associated with the service provider. In the present disclosure, it is contemplated that the entity (such as a service provider) can offer any type of service and/or product to optimize pre-existing, pre-owned MFDs by referring potential customers to an Internet website or a store that may or may not be associated with printing-related services and/or products. The term "entity" can refer to anything that may exist as a discrete and/or distinct unit that owns, operates, manages, and/or controls one or more of a plurality of machines (such as MFDs). For example, the term "entity" may include the term "company."

In summary, network management tools poll devices (e.g., printers and MFDs) to obtain current status information. It is desirable to have current status information, but this comes at an expense of a high amount of network traffic being generated. It is also desirable to have current status on a large number network devices, but communication with some devices take a larger amount of time and some devices fail to communicate at all. Alternatives such as registering for events on devices (e.g., SNMP traps) are not standardized, and generate excessive traffic on unwanted events.

As a result, the present disclosure proposes a method to group devices for communication based on performance criteria to improve overall efficiency while still providing the desired status data on a large number of networked devices. The criteria involve static performance data about the device and previously gathered dynamic performance data. The static grouping criterion is based on a device's capabilities such as the capability to communicate over a higher performance protocol. The dynamic performance grouping criteria is based on previous communication statistics such as the average response time and average retries needed to communicate with the device. Running several processes in parallel with each process configured to match the groups communication requirements results in a faster and more efficient means of gathering data for a large number of devices.

The present disclosure also includes as an additional embodiment a computer-readable medium which stores programmable instructions configured for being executed by at least one processor for performing the methods described herein according to the present disclosure. The computer-readable medium can include flash memory, CD-ROM, a hard drive, etc.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A printing system suitable for grouping a plurality of multifunction devices (MFDs), the system comprising:
   a storage station for storing information gathered from the plurality of MFDs by selectively polling the plurality of MFDs;
   wherein the information is selectively processed into two or more groups of MFDs, including at least one group of MFDs that did not reply during polling of the plurality of MFDs and at least one group of MFDs that did reply during polling of the plurality of MFDs, based on static performance data and dynamic performance data relating to the plurality of MFDs in order to minimize average polling times of the plurality of MFDs.

2. The system according to claim 1, wherein the static performance data is based on a capability of the plurality of MFDs to perform over one or more protocols.

3. The system according to claim 1, wherein the dynamic performance data is based on previous communication statistics.

4. The system according to claim 3, wherein the previous communication statistics include response time and average retries to communicate with the plurality of MFDs.

5. The system according to claim 1, wherein the information in the two or more groups are selectively processed in parallel.

6. The system according to claim 1, wherein the grouping of the plurality of MFDs is based on a current communications state.

7. The system according to claim 1, wherein the grouping of the plurality of MFDs is based on a previous communications state.

8. The system according to claim 1, wherein the grouping of the plurality of MFDs is based on a previous communications state and an average response time multiplied by an average retry count.

9. A method suitable for grouping a plurality of multifunction devices (MFDs), the method comprising:
   selectively polling the plurality of MFDs;
   receiving information from the plurality of MFDs selectively polled;
   storing the information gathered from the plurality of MFDs selectively polled; and
   selectively processing the information into two or more groups of MFDs, including at least one group of MFDs that did not reply during the step of selectively polling the plurality of MFDs and at least one group of MFDs that did reply during the step of selectively polling the plurality of MFDs, based on static performance data and dynamic performance data relating to the plurality of MFDs in order to minimize average polling times of the plurality of MFDs.

10. The method according to claim 9, wherein the static performance data is based on a capability of the plurality of MFDs to perform over one or more protocols.

11. The method according to claim 9, wherein the dynamic performance data is based on previous communication statistics.

12. The method according to claim 11, wherein the previous communication statistics include response time and average retries to communicate with the plurality of MFDs.

13. The method according to claim 9, wherein the information in the two or more groups are selectively processed in parallel.

14. The method according to claim 9, wherein the grouping of the plurality of MFDs is based on a current communications state.

15. The method according to claim 9, wherein the grouping of the plurality of MFDs is based on a previous communications state.

16. The method according to claim 9, wherein the grouping of the plurality of MFDs is based on a previous communications state and an average response time multiplied by an average retry count.

17. A computer-readable medium storing programmable instructions configured for being executed by at least one processor for performing a method suitable for grouping a plurality of multifunction devices (MFDs), the method comprising:

selectively polling the plurality of MFDs;

receiving information from the plurality of MFDs selectively polled;

storing the information gathered from the plurality of MFDs selectively polled; and selectively processing the information into two or more groups of MFDs, including at least one group of MFDs that did not reply during the step of selectively polling the plurality of MFDs and at least one group of MFDs that did reply during the step of selectively polling the plurality of MFDs, based on static performance data and dynamic performance data relating to the plurality of MFDs in order to minimize average polling times of the plurality of MFDs.

18. The method according to claim 17, wherein the static performance data is based on a capability of the plurality of MFDs to perform over one or more protocols.

19. The method according to claim 17, wherein the dynamic performance data is based on previous communication statistics.

20. The method according to claim 19, wherein the previous communication statistics include response time and average retries to communicate with the plurality of MFDs.

21. The method according to claim 17, wherein the information in the two or more groups are selectively processed in parallel.

22. The method according to claim 17, wherein the grouping of the plurality of MFDs is based on a current communications state.

23. The method according to claim 17, wherein the grouping of the plurality of MFDs is based on a previous communications state.

24. The method according to claim 17, wherein the grouping of the plurality of MFDs is based on a previous communications state and an average response time multiplied by an average retry count.

* * * * *